United States Patent
Meyer et al.

(10) Patent No.: US 7,278,953 B2
(45) Date of Patent: Oct. 9, 2007

(54) TRANSMISSION SHIFT CONTROL METHOD

(75) Inventors: Duane Fredrick Meyer, Hudson, IA (US); Joel Lee Mason, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 223 days.

(21) Appl. No.: 11/175,539

(22) Filed: Jul. 6, 2005

(65) Prior Publication Data

US 2007/0010373 A1  Jan. 11, 2007

(51) Int. Cl.
*B60W 10/02* (2006.01)
*B60W 10/04* (2006.01)

(52) U.S. Cl. ........................ 477/176; 477/180

(58) Field of Classification Search ........... 477/174, 477/175, 180, 181
See application file for complete search history.

(56) References Cited

U.S. PATENT DOCUMENTS

| | | | |
|---|---|---|---|
| 5,046,383 A * | 9/1991 | Butts et al. ............... 477/120 |
| 5,070,747 A * | 12/1991 | Lentz et al. .............. 477/149 |
| 5,072,390 A * | 12/1991 | Lentz et al. ............... 701/60 |
| 5,211,079 A * | 5/1993 | Runde et al. ............... 477/61 |
| 5,467,854 A | 11/1995 | Creger et al. ............ 192/87.18 |
| 5,580,332 A | 12/1996 | Mitchell et al. ........... 477/143 |
| 6,193,630 B1 | 2/2001 | Janasek et al. ........... 477/156 |
| 6,435,049 B1 | 8/2002 | Janasek et al. ............. 74/335 |
| 6,880,393 B2 * | 4/2005 | Bulgrien et al. ........... 73/118.1 |
| 7,008,344 B2 * | 3/2006 | Aikawa et al. ............ 475/127 |

* cited by examiner

*Primary Examiner*—Tisha Lewis (57) ABSTRACT

A method is provided for shifting a powershift transmission in a vehicle having an electronic engine control unit and an electronic transmission control unit. The method rapidly reduces off-going clutch pressure to a pressure which is slightly higher than a Predicted Off Slip Pressure, and rapidly increases on-coming clutch pressure P-on to a pressure that is slightly lower than a Predicted On Slip Pressure. Then, the method includes gradually decreasing P-off and gradually increasing P-on until slipping of the off-going clutch is detected, and gradually and more slowly decreasing P-off and gradually more slowly increasing P-on until the oncoming clutch begins to carry torque previously carried by the off-going clutch. Finally, the method includes more rapidly decreasing P-off to reservoir pressure, and more rapidly increasing P-on to a full on pressure.

5 Claims, 8 Drawing Sheets

| Fig. 5A |
|---------|
| Fig. 5B |
| Fig. 5C |

```
* REENTRANCY:
****************************************************/
UInt8_T Calculate_Slip(Clutch_Slip_T *Slip_Element, UInt16_T input_speed, UInt8_T positive_slip_flag)
{
   UInt16_T new_speed_ratio;
   UInt8_T u8_slip_direction;

//Calculate new ratio of output speed to input speed.
   //The result of the multiplication of the speed variable by the gear ratio
   //must be in units of *100000.

if (input_speed)
   {
      new_speed_ratio = (UInt16_T)((((UInt32_T)*Slip_Element->speed_variable_ptr *
                         (UInt32_T)*Slip_Element->Gear_Ratio_ptr / (UInt32_T)input_speed) / 100);
   }
   else
   {
      new_speed_ratio = ZERO_SLIP_RATIO;
   }

//Implement an N/(N+1) averaging filter.
   //The addition of half of (N+1) before dividing by N+1 evenly distributes the error of the
   //result above and below the actual value. Without doing this (i.e. just truncating), all of the error
   //is one sided. This is just a method of rounding.
   Slip_Element->Slip_Speed_Ratio =
         ((((Slip_Element->Slip_Filter_Multiplier * Slip_Element->Slip_Speed_Ratio) + new_speed_ratio) +
         ((Slip_Element->Slip_Filter_Multiplier + 1)/2)) / (Slip_Element->Slip_Filter_Multiplier + 1);
```

Fig. 5B

```
if (Slip_Element->Slip_Speed_Ratio <= 1000)
{
    //Negative slip has occurred
    u8_slip_direction = NEGATIVE_SLIP_PARM;
    if ((positive_slip_flag == NEGATIVE_SLIP_PARM) ||
        (positive_slip_flag == EITHER_SLIP_PARM))
    {
        //Negative slip is detected and that is what we are looking for
        Slip_Element->Slip = 1000 - Slip_Element->Slip_Speed_Ratio;
    }
    else
    {
        //We are actually looking for positive slip
        Slip_Element->Slip = 0;
    }
}
else
{
    //Positive slip has occurred.
    u8_slip_direction = POSITIVE_SLIP_PARM;
```

```
if ((positive_slip_flag == POSITIVE_SLIP_PARM) ||
    (positive_slip_flag == EITHER_SLIP_PARM))
{
    //Positive slip is detected and that is what we are looking for
    Slip_Element->Slip = Slip_Element->Slip_Speed_Ratio - 1000;
}
else
{
    //We are actually looking for negative slip
    Slip_Element->Slip = 0;
}
//Cap the slip to the maximum allowed.
if (Slip_Element->Slip > Slip_Element->Max_Slip)
{
    Slip_Element->Slip = Slip_Element->Max_Slip;
}
//Return the direction of the slip.
return u8_slip_direction;
}
```

TRANSMISSION SHIFT CONTROL METHOD

BACKGROUND

The present invention relates to a method of shifting a powershift transmission.

Conventional powershift transmissions use solenoid controlled valves to control pressure to each clutch, and such transmissions change ratios by disengaging one or more clutches while simultaneously engaging one or more clutches. Such transmissions also rely on a signal that is representative of engine load to determine the pressure applied to the on-coming clutches The shift smoothness is normally controlled by engaging the on-coming clutches at low pressure. The amount of pressure necessary is dependent on the load being transmitted by the transmission to the drive wheels. If the engagement pressure is too low, the vehicle may lose speed during the shift. If the engagement pressure is too high, the shift will be very aggressive and harsh.

Various problems can occur with this conventional type of system. For example, sometimes the on-coming clutch piston will not move enough to start engagement, even though the off-going clutch has been disengaged. Under load this will cause the vehicle to lose speed during the shift. Even though the solenoid valve is opened enough to provide the correct pressure, the on-coming clutch may not be engaged and cannot transmit torque.

Another problem is that the engine load signal may be misleading. For example, in agricultural tractor applications, there are conditions where much of the engine load may be used to power a hydraulic pump or power-take-off (PTO) implements. This may cause a harsh shift quality because the on-coming clutch pressure is commanded at high pressure when instead it should have been commanded low because actually only a small amount of the engine power was being transmitted to the drive wheels.

A method of reducing the problem of the on-coming clutch not getting filled is described in U.S. Pat. No. 5,580,332 issued in 1996 to Mitchell et al. In this method, the actual time to fill the clutch is determined during each shift. Depending on whether the clutch filled sooner than expected or later than expected, the fill time that is used for the next clutch engagement may be adjusted. The fill time is determined by bringing the off-going clutch down to a low stable value, while the on-coming clutch is brought up to fill pressure, then looking for the point in time where the off-going clutch slips or the torque converter speed ratio changes.

A method of controlling the shifting of powershift transmissions and overcoming both deficiencies is described in U.S. Pat. No. 6,193,630 and U.S. Pat. No. 6,435,049, both assigned to the assignee of this application. In this method, the first step in a shift is to bring an off-going clutch down in pressure until slip is detected. Slip is caused purely by the load on the vehicle, not by the on-coming clutch coming up in pressure. The off-going clutch is then maintained in a condition of slight slip while on-coming clutches are filled and swapping of other intermediate clutches are performed. Finally, the last swap is made between this off-going clutch and the final on-coming clutch.

With this method, under some conditions where there is little load on the drivetrain, it may take a considerable amount of time to detect slip, thus causing a delay in time from when the operator commands a shift by moving a shift lever and until the shift actually occurs. Such delays are disliked by operators because it gives them the impression of not being in control. Also with this method, only after slip is detected in the off-going clutch, is the on-coming clutch brought up to pressure. This further delays the completion of the actual shift.

Another disadvantage of this method is that the first detection of slip always results in the vehicle slowing down. During an upshift, it is not desirable to feel the vehicle first slow down before it finally speeds up.

SUMMARY

Accordingly, an object of this invention is to provide a method for smoothly shifting a powershift transmission which does not cause the vehicle to lose speed during the shift.

A further object of the invention is to provide such a method for smoothly shifting a powershift transmission which does not cause a harsh shift quality due to a misleading engine load signal.

These and other objects are achieved by the present invention, wherein when a shift is commanded, both the off-going and on-coming clutches are commanded to pressures that are a function of the engine load signal. The purpose of this step is to quickly get the off-going clutch to the pressure that is slightly higher than what it would be expected to start slipping at. Likewise, the on-coming clutch is quickly brought up to a pressure that is slightly lower than what it would take to carry the engine load. From that starting point, the off-going clutch is ramped down in pressure while, simultaneously, the on-coming clutch is being ramped up.

Speed sensors are used on the transmission input shaft, transmission output shaft, and an internal transmission component so that the system can determine when any of the clutches are slipping.

The ramping of the off-going clutch down and the on-coming clutch up continues until slip is detected in the off-going clutch.

In the case of a downshift, slip is caused by both the external load on the vehicle as well as the torque being produced by the on-coming clutch. When slip is detected, the pressure in both clutches are stabilized and slowly ramped so that a smooth transition can be made from one clutch to the other.

In the case of an upshift, the ramping of the off-going clutch down and the on-coming clutch up continues until positive slippage is detected in the off-going clutch. In this case, the torque produced by the on-coming clutch has to overcome both the external load on the vehicle as well as the torque being carried by the off-going clutch. Similar to the downshift, when positive slip is detected, the pressure in both clutches are stabilized and slowly ramped so that a smooth transition can be made.

In the above described shift only one clutch is engaging and one clutch is disengaging. This control strategy is also usable in shifts that require multiple clutch swapping. The swapping of the other pairs of clutches will be commanded after slip is detected in the first off-going clutch and before the last on-coming clutch is brought up to pressure.

DETAILED DESCRIPTION

Figure 1:
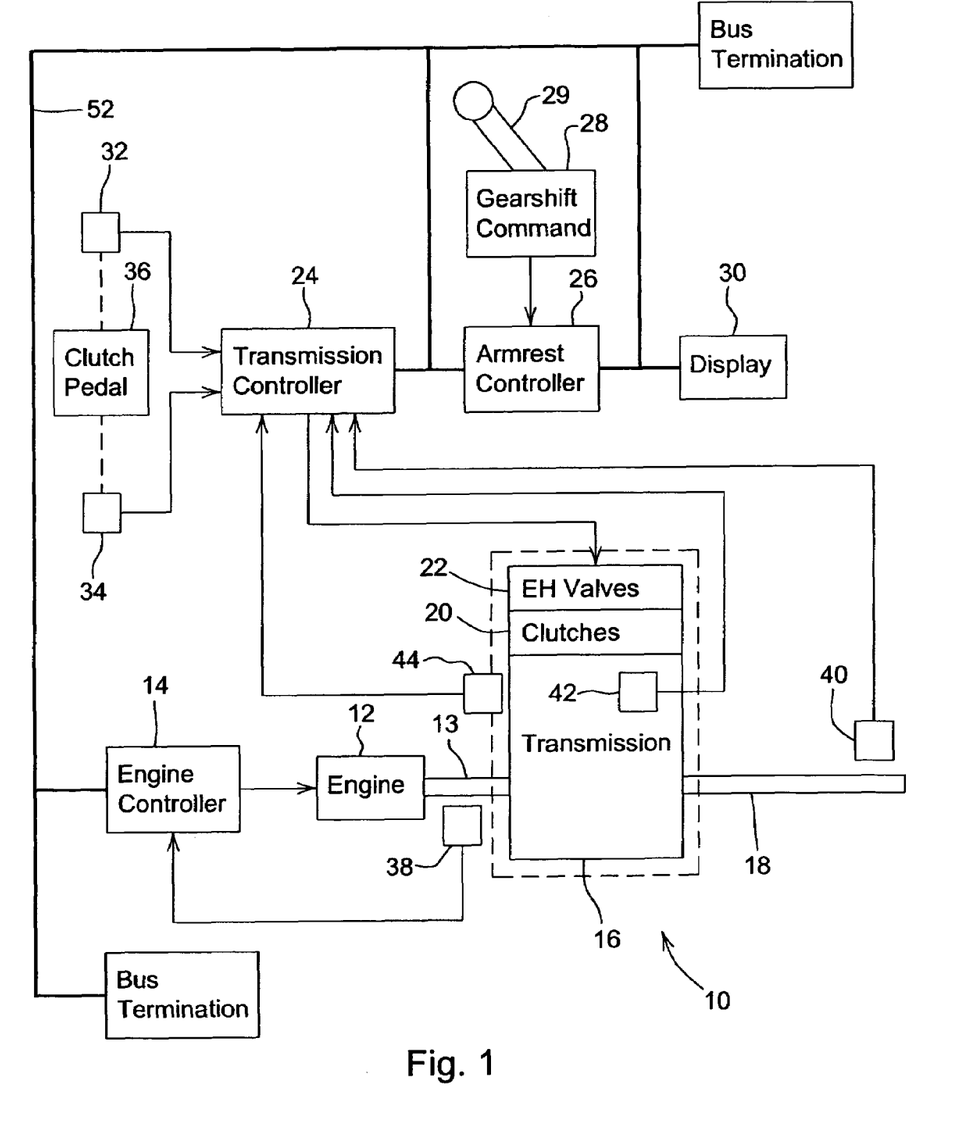
FIG. 1 is a schematic block diagram of a transmission control system according to the present invention.

FIG. 1 is a schematic block diagram of a microprocessor-based transmission control system 10 to which the present invention is applicable. A vehicle power train includes an engine 12 which is controlled by electronic engine control unit 14, and which drives a power shift transmission (PST) 16 via input shaft 13. Transmission 16 has a countershaft 15, and an output shaft 18 which is connected to drive wheels (not shown). The PST 16 includes a set of pressure operated control elements or clutches 20 which are controlled by a corresponding set of solenoid operated proportional control valves 22. The transmission 16 may be a transmission such as described in U.S. Pat. No. 5,011,465, issued Apr. 30, 1991 to Jeffries et al., and assigned to the assignee of this application. The valves 22 may be two-stage electro-hydraulic valves as described in U.S. Pat. No. 4,741,364, issued May 3, 1988 to Stoss et al. and assigned to applicant's assignee.

The PST 16 is controlled by a transmission control unit 24, an armrest control unit 26 which receives and interprets shift lever commands from shift command lever unit 28. Shift command lever unit 28 is preferably a conventional shift command lever unit used on production John Deere tractors, and includes a gearshift lever 29. Such a shift command lever unit is described in U.S. Pat. No. 5,406,860, issued Apr. 18, 1995 to Easton, et al., and assigned to the assignee of this application. A display unit 30 may display information relating to the system 10. The transmission control unit 24 and the armrest control unit 26 are preferably microprocessor-based electronic control units.

Manual control is achieved via an operator-controlled gearshift command lever unit 28. Unit 28 provide signals representing the position of the lever 29 to the armrest control unit 26. The armrest control unit 26 sends gear command information to transmission control unit 24 via a vehicle communication bus 52.

A clutch engagement sensor 32 and a clutch disengagement switch 34 provide signals representing the position of a clutch pedal 36. The engine control unit 14 receives signals from an engine speed sensor 38, as well as other sensors (not shown) which enable the engine control unit to transmit engine load information on the vehicle communication bus 52. The transmission controller 24 receives signals from an axle speed sensor 40, a counter-shaft speed sensor 42 which senses the speed of an intermediate shaft or counter-shaft 15 which is internal to the transmission 16, and a transmission oil temperature sensor 44. The transmission controller 24 sends wheel speed (calculated from the axle speed based on tire size), and oil temperature information to the display 30 via the vehicle communications bus 52. The intermediate shaft speed information is used only for control purposes and is not displayed under normal operating conditions.

Figure 2:
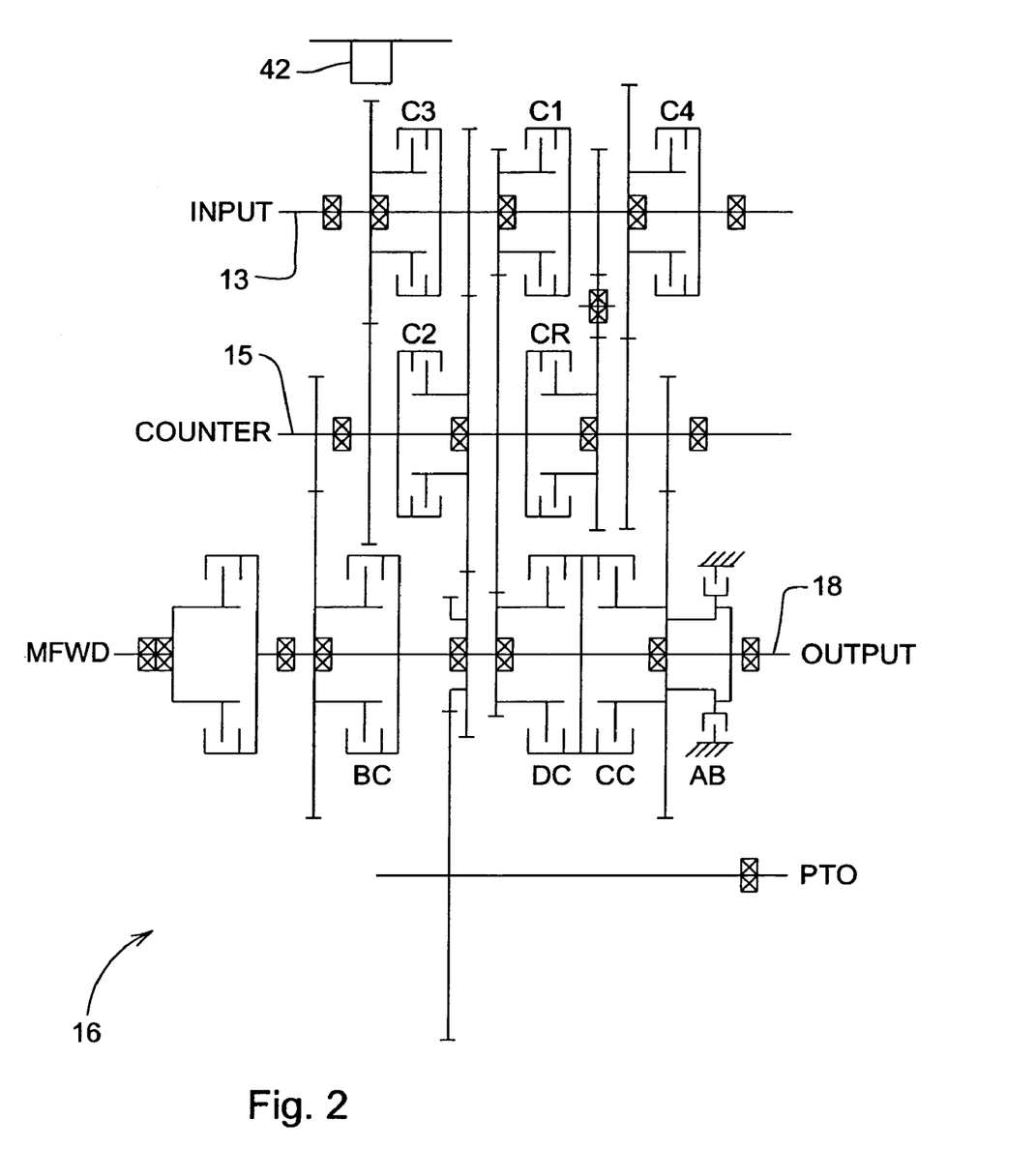
FIG. 2 is a schematic diagram of the transmission of FIG. 1.

The transmission control unit 24 includes a commercially available microprocessor which supplies control signals to a set of valve drivers (not shown) which provide variable duty cycle pulse-width-modulated voltage control signals to the valves 22. The transmission control unit 24 generates control signals as a function of various sensed and operator determined inputs in order to achieve a desired pressure in the clutches and to thereby control the shifting of the transmission 16 in a desired manner. As best seen in FIG. 2, the transmission 16 includes various shafts, gears and clutches, including clutches AB, BC, CC, DC, C1, C2, C3, C4 and CR. For example, when a 5F to 4F range shift is performed clutch AB is disengaged while clutch BC is engaged, and clutch C4 is disengaged while clutch C1 is engaged.

The transmission controller 24 executes a known production main loop algorithm (not shown) which controls the time varying hydraulic pressures which are applied to the various transmission clutch elements. In accordance with the present invention, the controller also executes an algorithm represented by FIGS. 3 and 4. The conversion of the flow charts of FIGS. 3 and 4 into a standard language for implementing the algorithm described by the flow chart in a digital computer or microprocessor, will be evident to one with ordinary skill in the art.

Figure 3:
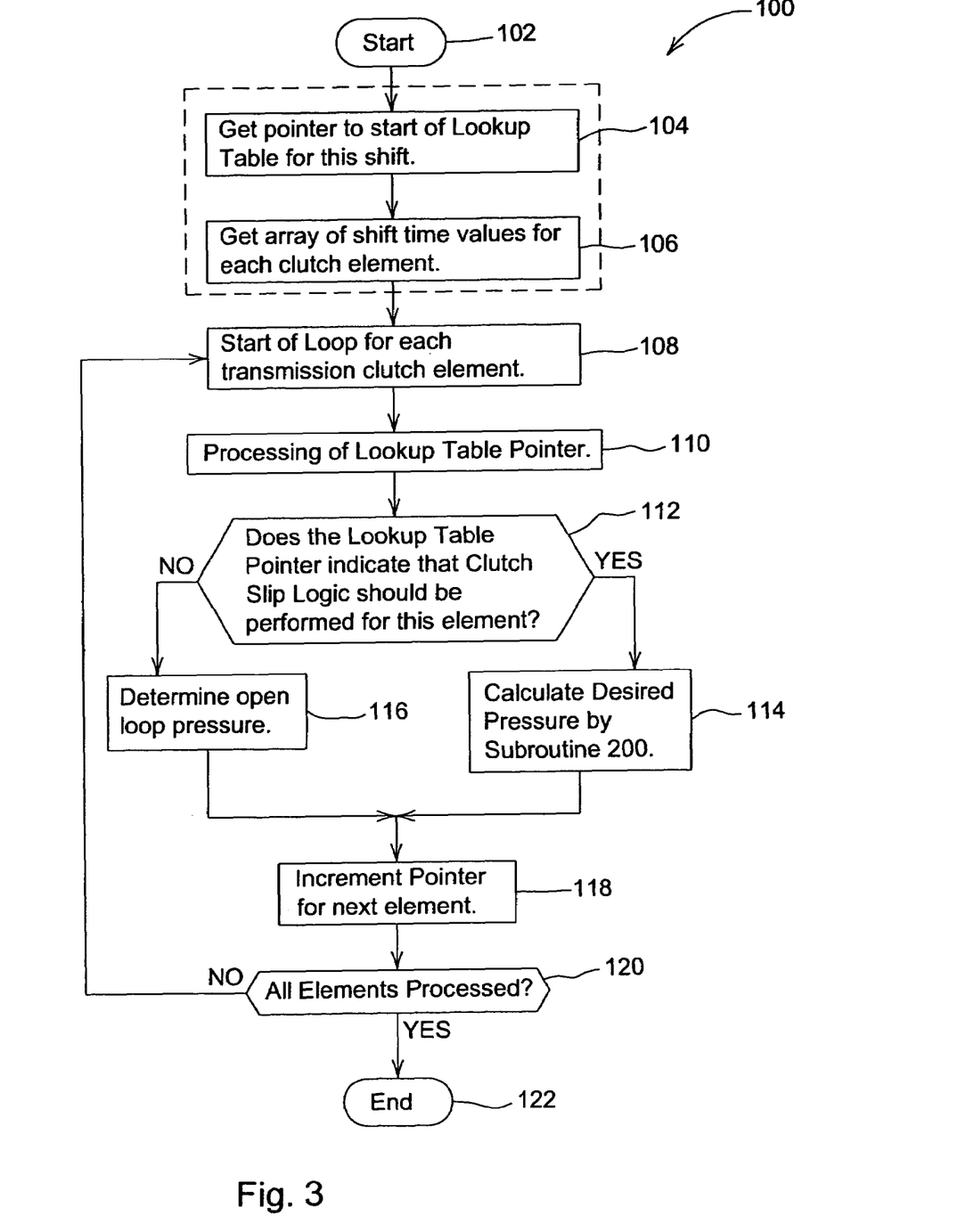
FIG. 3 is logic flow diagram illustrating an algorithm executed by the transmission controller of FIG. 1.

FIG. 3 illustrates how this method is implemented by an algorithm 100 executed by the microcomputer-based transmission controller 24. This algorithm 100 is preferably executed at least once every ten milliseconds by a task manager type of real time operating system running in the transmission controller 24.

Figure 4:
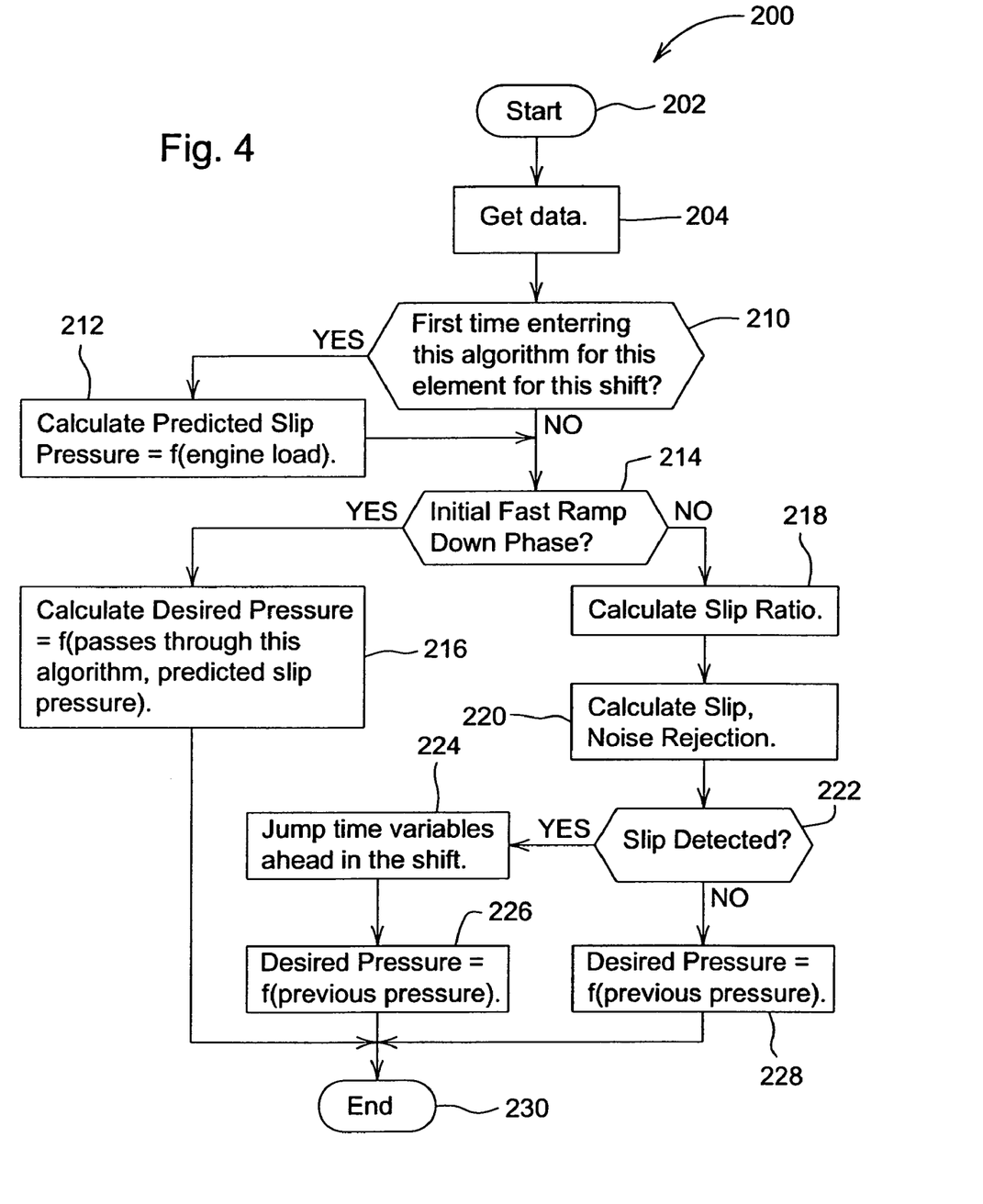
FIG. 4 is logic flow diagram illustrating an algorithm represented by step 106 of FIG. 1.

Before the algorithm 100 is run, the controller 24 will have already determined or calculated 1) what shift is desired to be executed, and 2) an array of values which represent the current time into the shift for each clutch element. The algorithms 100 and 200 determine desired clutch pressure values. After the algorithms 100 and 200 are run, the main loop algorithm applies the desired pressures to the particular clutches involved in the shift being executed.

Referring now to FIG. 3, the algorithm 100 begins at step 102. At step 104 the algorithm is supplied with a pointer to a lookup table (not shown) containing known shift parameters for the particular shift being commanded, in this case, for example, a 5F to 4F range shift. Then at step 106 the algorithm obtains an array of pre-determined shift time values for each clutch element. Step 108 represents a start of the loop for each transmission clutch element. The main clutch element loop which begins at step 108 is executed once for each transmission clutch element.

Lookup Table Processing is performed at step 110. This processing uses the current time value for the clutch and the desired shift to set a lookup table pointer to the command step that should be executed for the transmission clutch element. Each command step contains the following three components. First, the time during the shift when this command step should be executed. This time could be an absolute time, or could be relative to some previous command step. Second, either a pressure command or a special instruction. Third, a slope. The slope entry is used for open-loop shifts that are not the subject of this patent application.

Step 112 determines whether or not the lookup table pointer indicates that clutch slip logic should be performed for this transmission clutch element. If yes, then step 114 executes a clutch slip function or subroutine 200 which calculates a desired clutch pressure according to a subroutine or function described in more detail with respect to FIG. 4. If not, the algorithm proceeds to step 116 and the clutch pressures are determined in a known open loop manner as was done in a previous production transmission controller.

Referring now to FIG. 4, the clutch slip subroutine 200 begins a step 202. Next, at step 204 the subroutine obtains engine speed data from sensor 38, engine load data from engine controller 14, shaft speed data from either sensor 40 or 42, and gear ratio data from a shaft speed vs. current gear lookup table (not shown).

If it is the first time the subroutine 200 is being entered for this particular transmission clutch element for this particular shift, then the subroutine is directed to step 212, else to step 214.

Step 212 calculates a predicted slip pressure as a function of the engine load from step 204. More particularly, step 212 relates the amount of engine torque going through the transmission 16 to the slip pressure according to the linear equation: Engine torque (Nm)=slip pressure (kPa)*m+b, where the slope m and the intercept b are found empirically. The predicted slip pressure is then calculated by using the above equation, solving for slip pressure. Thus, predicted slip pressure (kPa)=(engine torque−b)/m. Preferably, the empirically determined intercept b is made relative to the value of the calibrated fill pressure for the transmission clutch element by subtracting the product of the calibrated fill pressure and slope m. Thus, the equation developed from experimental data can be applied to all tractors to which the method or system described in this application applies.

Next, step 214 determines if the algorithm is in a fast ramp down phase. Each clutch element has an associated software loop counter (not shown) which indicates the number of passes through the clutch slip subroutine 200 since the shift started. Whether or not the subroutine executes a fast ramp down phase or proceeds to a gradual ramp down phase is based solely on the value of this loop counter. If the loop counter is less than some value, 6 for example, the subroutine proceeds to step 216 and causes a fast ramp down in the pressure of the off-going clutch. Step 216 calculates a desired pressure value as a function of the predicted slip-pressure determined in step 212 and the number of passes through the subroutine 200, wherein the slip-pressure determined in step 212 is essentially a target pressure for the initial fast ramp down. For example, the following equation could be used to calculate the commanded pressure during this fast ramp down phase: Commanded Pressure=Previous Pressure Output−(Target Change*⅔).

In the above equation, the Target Change is the difference between the Previous Pressure Output and the predicted slip pressure from step 212, where the previous pressure output is initialized to full system pressure. After step 216, the subroutine 200 and algorithm 100 end and, in a known manner, the controller 24 applies the commanded pressure to the appropriate clutch element of the transmission 16.

The intent of the fast ramp down phase is to decrease pressure on the clutch rapidly to a pressure that is slightly above where the engine load signal indicates the clutch element will just begin to slip. This method is used to minimize the algorithm's overall execution time. The profile of the pressure command during the fast ramp down phase is determined empirically to minimize pressure undershoot.

Returning to step 214, if the algorithm is not in a fast ramp down phase (such as when the initial fast ramp down phase has been completed), then step 214 directs the subroutine to step 218 which operates to cause the clutch pressure to be ramped down more gradually, such as by a fixed amount each time through the routine, 2 kPa for example, while the system attempts to detect slip in the clutch. Slip is defined as relative motion between the clutch plates (not shown). Step 218 calculates a Slip ratio value using this equation: Slip ratio=(shaft speed*gear ratio)/engine speed. The shaft speed may be output shaft speed or an intermediate transmission speed, depending on which transmission clutch is being slipped. The gear ratio is determined from the current gear the transmission is in at the start of the shift. Preferably, the slip ratio is calculated with a precision of 0.1%.

Next, step 220 applies a noise rejection or filtering process to the Slip Ratio value from step 218 and calculates an Actual Slip based on the noise filtered slip ratio. Step 220 preferably includes an N/(N+1) digital average filter and additional logic which operates to check the direction of the slip (positive or negative) and compares the current slip value with the value from the previous pass through the algorithm. N is an integer number that represents the size of the averaging filter. Preferably in the present application, N is 0 (i.e. meaning no averaging) for the clutches 20 of transmission 16. However, some other number might work in other applications.

Figures 5, 5A:
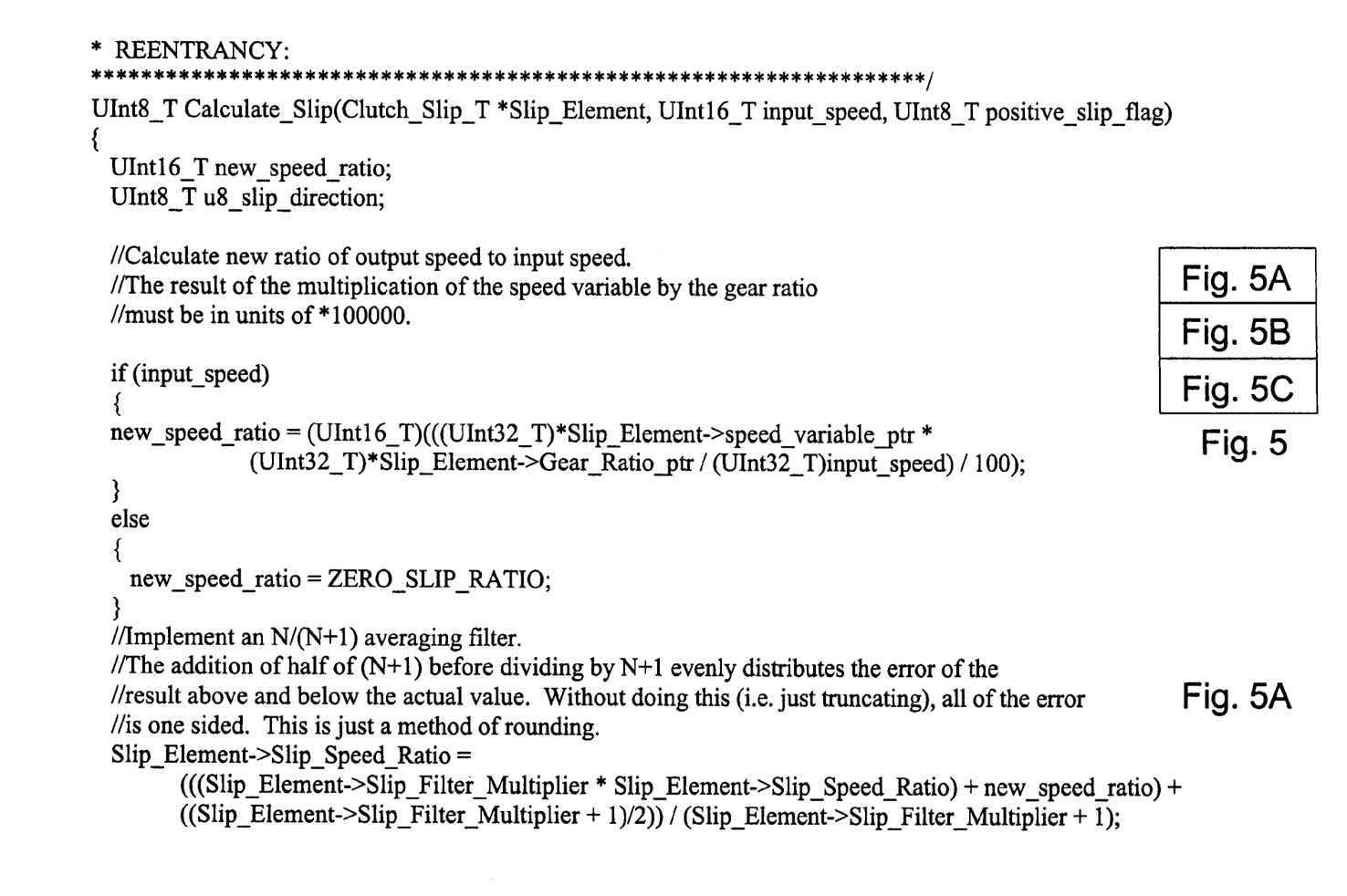
FIGS. 5A, 5B and 5C contain a pseudo code program listing of a subroutine performed by the algorithm represented by FIG. 4.
Figure 5B:
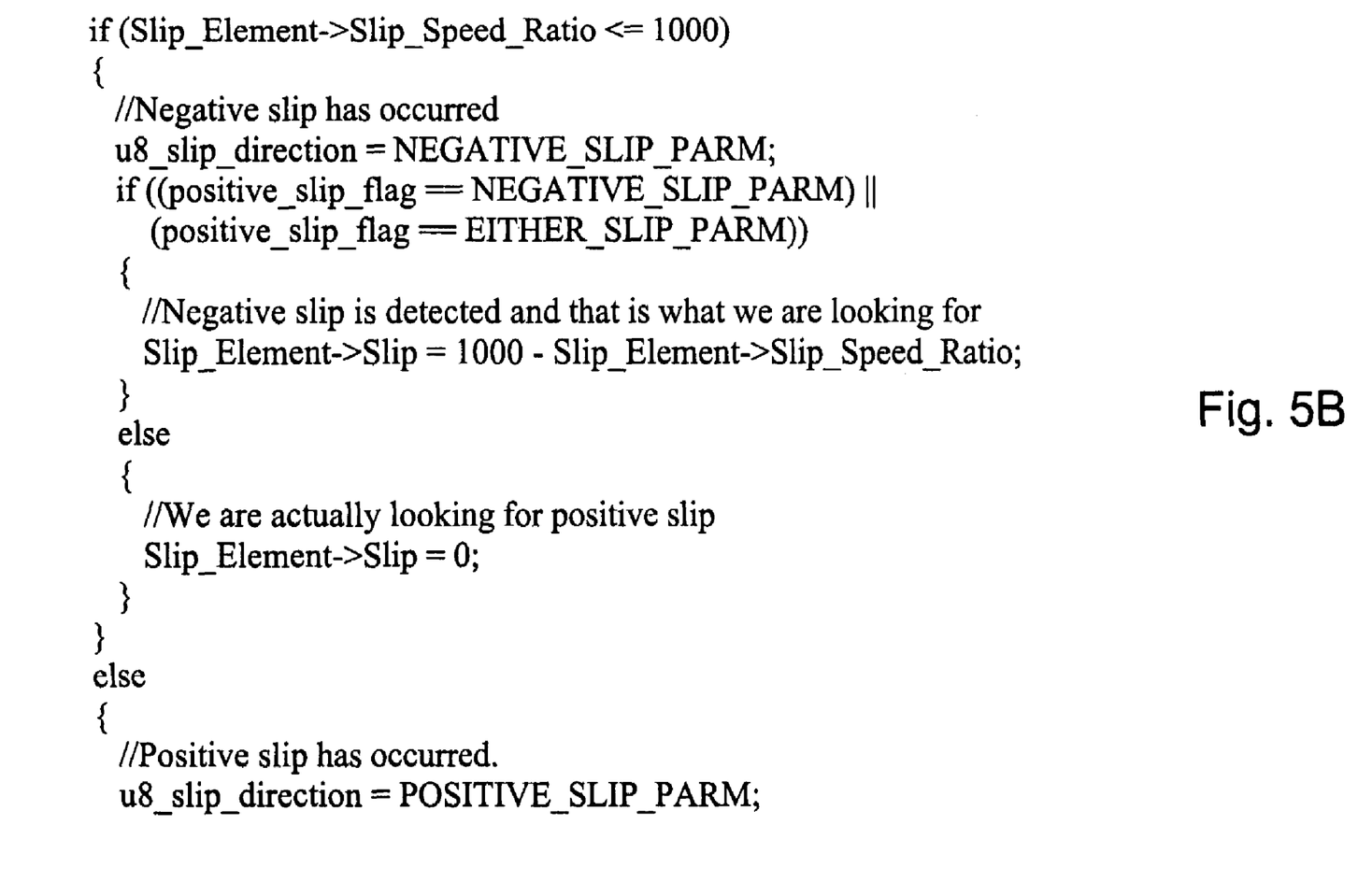
Figure 5C:
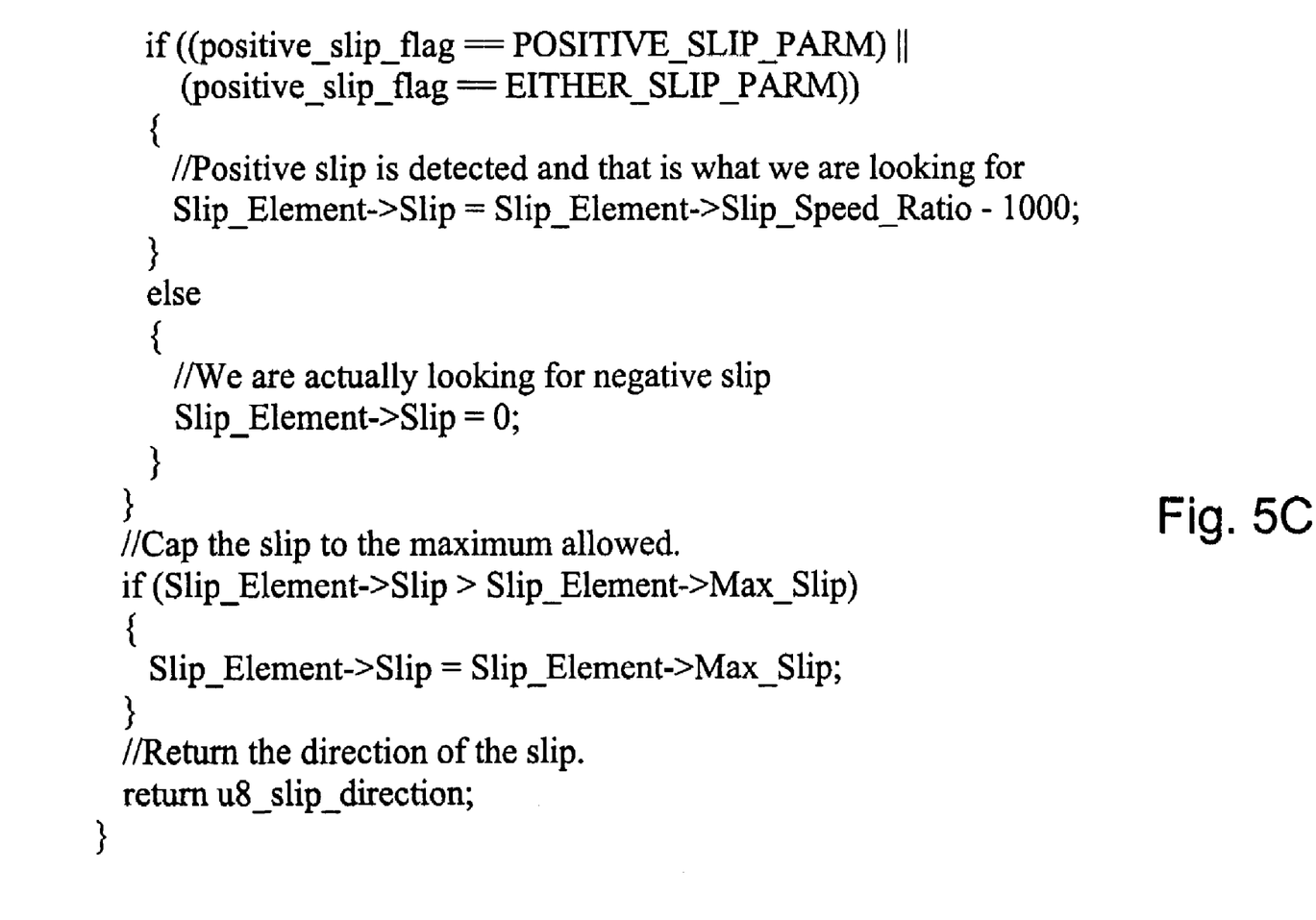

The functions of step 220 are preferably performed by the pseudo code set forth in FIGS. 5A-5C. Thus, this pseudo code calculates slip (of the on-coming or off-going clutch) by comparing the input speed to the speed of the output shaft 18 or the countershaft 15, as appropriate. Normally, the input speed will be the engine speed. Averaging of the calculated value is done through the multiplier N as described above. This function sets the new average value of clutch slip.

The pseudo code uses a UInt16_T (unsigned, 16-bit) parameter representing input speed and a pointer to stored data associated with the particular clutch. The pseudo code outputs or returns a UInt8_T (unsigned, 8-bit) value indicating the direction of the slip. Positive slip is defined as the output speed being greater than the input speed, negative slip is when the input speed is greater than the output speed.

If negative slip is being detected, a slip ratio of 0.980 would correspond to an actual slip of 2.0%. If positive slip is being detected, a slip ratio of 1.020 would correspond to an actual slip of 2.0%.

Step 222 determines whether or not slip is detected. For example, valid slip is detected if the current slip is greater in magnitude than the previous value of slip, in the same direction, and is greater than a Slip Detection Threshold, preferably 3.0%. Furthermore, a control parameter, preferably 2, is stored in memory for each clutch element to set how many valid slip events must occur before slip is detected. These values can be determined empirically, and other values may be preferable in other applications.

If slip is not detected at step 222, then step 228 calculates a Desired Pressure value by subtracting a fixed amount from the previous pressure command.

If slip is detected at step 222, then step 224 increments to the same time value for each time value in the array of current shift time values for each clutch element.

Preferably, the current time value for each clutch element is set equal to a realign time+TWAKE_MAX where TWAKE_MAX is a constant stored in memory, such as 500 msec. This has the effect of aligning all of the clutch desired pressure commands in real time. The realign time is chosen to be large enough to allow enough time for slip detection in worst-case conditions. This process can be described as "jumping ahead in time" in the shift, since the next time the main loop is executed, the command step corresponding to a time=realign time+TWAKE_MAX will be the command step executed for each clutch element.

Then step 226 calculates a Desired Pressure value by subtracting a fixed amount from the previous pressure command.

Following either step 226 or 228 the algorithm ends at step 230.

Figure 6:
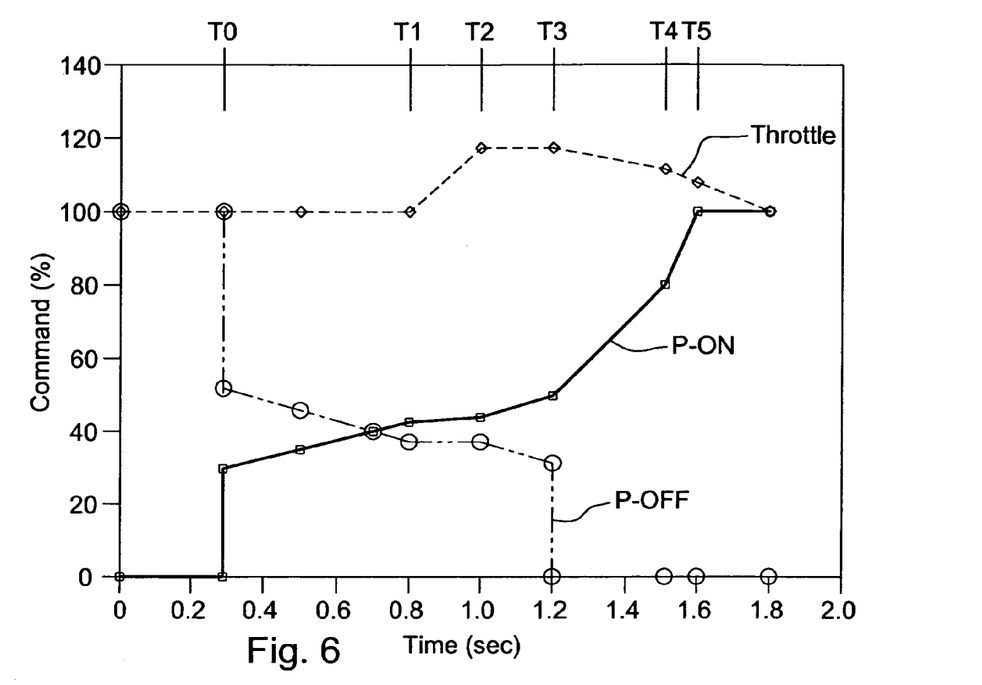
FIG. 6 is a timing diagram of clutch pressure commands and engine throttle according to the present invention.

Referring now to FIG. 6, when a downshift shift is commanded at time T0, both the off-going clutch pressure P-off and the on-coming clutch pressure P-on are commanded to pressures that are a function of the engine load (which is derived from a fuel signal from the engine control unit 14). More particularly, the off-going clutch pressure P-off is quickly reduced to a pressure which is slightly higher than a pressure at which it would start to slip. Also, the on-coming clutch pressure P-on is quickly increased to a pressure that is slightly lower than a pressure at which it would carry the engine load.

From that starting point, the off-going clutch pressure P-off is gradually decreased or ramped down while the on-coming clutch pressure P-on is gradually increased or ramped up. While P-off and P-on are being modified, speed sensors 40, 42 and 44 monitor the speed of the transmission input shaft 13, transmission output shaft 18, and the intermediate shaft or counter-shaft 15 to determine when any of the clutches are slipping. Pressures P-off and P-on continue to be modified as described until slipping of the off-going clutch is detected.

In the case of the downshift of FIG. 2, slip is caused by both the external load on the vehicle as well as the torque being produced by the on-coming clutch. When slip of off-going clutch is detected, both pressures P-off and P-on are stabilized and more slowly modified so that torque can be smoothly transferred from the off-going clutch to the on-coming clutch.

In the case of an upshift, P-off decreases and P-on increases until positive slippage is detected in the off-going clutch. In this case, the torque produced by the on-coming clutch has to overcome both the external load on the vehicle as well as the torque being carried by the off-going clutch. Similar to the downshift, when positive slip is detected, both pressures P-off and P-on are stabilized and slowly ramped so that a smooth transition can be made.

Instead of using open loop control of the clutch pressure after slip is detected as in FIG. 6, closed loop control could be used wherein the system would detect lockup of the on-coming clutch and also provide control of the clutch to achieve lockup in the desired time interval. The shift would be ended upon lockup of the on-coming clutch, and the off-going clutch could then be fully released and the on-coming clutch brought up to full pressure as in FIG. 7.

A further feature which may be used with this shift control method is to change the engine throttle speed command starting at the time when slipping of the output clutch is first detected. This further improves the smoothness of the shift. Changing the throttle speed command during the shifting of powershift transmissions is described in U.S. Pat. No. 6,254,509. The present invention could determine the exact time event when the shift actually starts which helps in timing the throttle command changes to the actual shift.

The description above relates to a shift where only one clutch is engaging and one clutch is disengaging. However, the method of the present invention could also be used in shifts which require multiple clutch swapping. The swapping of the other pairs of clutches would be commanded after slip is detected in the first off-going clutch-and before the last on-coming clutch is brought up to pressure.

Figure 7:
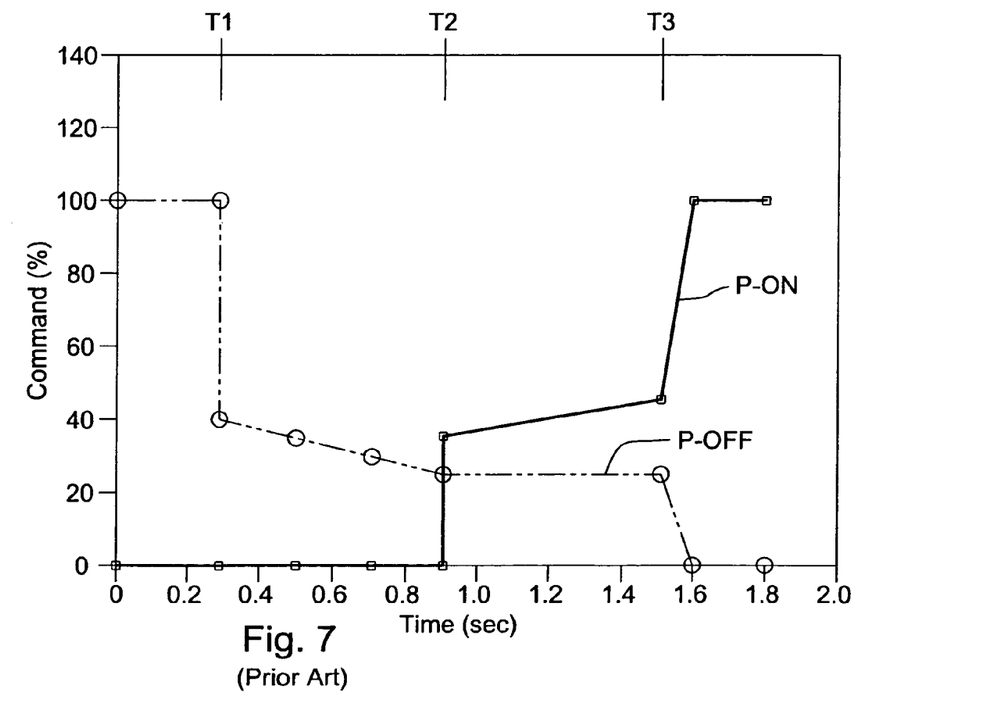
FIG. 7 is a timing diagram of clutch pressure commands according to a prior art transmission control system.

FIG. 7 illustrates a shift according to the prior art methods described in previously mentioned U.S. Pat. Nos. 6,193,630 and 6,435,049. In this method, when a shift begins a time t1 the pressure of the off-going clutch is rapidly reduced and then gradually reduced until slip is detected at time t2. The pressure of the off-going clutch is then maintained in a condition of slight slip until time t3 while the on-coming clutch is filled and swapping of other intermediate clutches (not shown) are performed. Finally, the last swap is made at time t3 when the off-going clutch is further rapidly depressurized and the on-coming clutch is fully pressurized.

Because the off-going clutch will not slip until the on-coming clutch is full and carrying torque, the method of the present invention avoids the problem of the on-coming clutch not being fully pressurized and engaged when the off-going clutch is released.

Because the off-going clutch is ramped down and then held at the pressure where slip occurred, the method of the present invention prevents the rough shift that could occur when the load signal was misleading and the oncoming clutch is at too high of a pressure. Keeping the off-going clutch at a pressure where slip starts to occur prevents the on-coming clutch from engaging too rapidly and causing an aggressive, harsh shift.

The shift control method of the present invention is especially effective in making downshifts smooth. It is better to transition to the next gear by slowly releasing the off-going clutch rather than bringing the on-coming clutch on at low pressure while fully releasing the off-going clutch.

With this new shift control method, because the on-coming clutches are filled and carrying torque when slip is detected, slip is detected quicker when under low load conditions and the gap between the operator commanding a shift and the shift actually occurring is reduced. Also, operator expectations for an upshift are met. The vehicle only speeds up during an upshift, it doesn't initially slow down.

A signal representing the initial slipping of the off-going clutch slipping, provides a good indication that the shift has started and such a signal can be used to synchronize throttle command changes to the engine. Such throttle command changes to the engine during the shift can further improve shift smoothness.

As compared to the method described in U.S. Pat. No. 5,580,332, this new shift method of the present invention reacts to the detection of clutch slip, it does not only use this information to adjust the fill time the next time the clutch is being engaged. Clutch slip is determined while the off-going clutch pressure is ramping down and the on-coming clutch pressure is ramping up, not by putting the off-going clutch at a constant low pressure and the on-coming clutch at a constant low fill pressure.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A method of shifting a powershift transmission having an off-going clutch and an on-coming clutch, the method comprising:

when a shift is commanded, rapidly reducing off-going clutch pressure, P-off, to a pressure which is slightly higher than a pressure (Predicted Off Slip Pressure) at which the off-going clutch would start to slip, and rapidly increasing on-coming clutch pressure P-on to a pressure that is slightly lower than a pressure (Predicted On Slip Pressure) at which the on-coming clutch would transmit torque;

thereafter, gradually decreasing P-off and gradually increasing P-on until slipping of the off-going clutch is detected;

thereafter, gradually and more slowly decreasing P-off and gradually and more slowly increasing P-on until the oncoming clutch begins to carry torque previously carried by the off-going clutch; and thereafter more rapidly decreasing P-off to reservoir pressure, and more rapidly increasing P-on to a full on pressure.

2. The shifting method of claim 1, further comprising:
determining Predicted Off Slip Pressure and Predicted On Slip Pressure as a function of engine load.

3. The shifting method of claim 1, wherein:
determining engine load from a vehicle engine control unit.

4. In a vehicle having an engine controlled by an electronic engine control unit and a powershift transmission controlled by an electronic transmission control unit, during a shift the powershift transmission having an off-going clutch and an on-coming clutch, a method of shifting the powershift transmission in response to a shift command, the method comprising:

determining a Predicted Off Slip Pressure for the off-going clutch as a function of engine load, the Predicted Off Slip Pressure being a pressure at which the off-going clutch would start to slip;

determining a Predicted On Slip Pressure for the on-coming clutch as a function of engine load, the Predicted On Slip Pressure being a pressure at which the on-coming clutch would start to transmit torque;

rapidly reducing off-going clutch pressure, P-off, to a pressure which is slightly higher than the Predicted Off Slip Pressure, and rapidly increasing on-coming clutch pressure P-on to a pressure that is slightly lower than the Predicted On Slip Pressure;

thereafter, gradually decreasing P-off and gradually increasing P-on until slipping of the off-going clutch is detected;

thereafter, gradually and more slowly decreasing P-off and gradually and more slowly increasing P-on until the oncoming clutch begins to carry torque previously carried by the off-going clutch; and thereafter more rapidly decreasing P-off to reservoir pressure, and more rapidly increasing P-on to a full on pressure.

5. The shifting method of claim 1, further comprising:
determining engine load from the engine control unit.

* * * * *